No. 864,695. PATENTED AUG. 27, 1907.
O. ROTHENSTEIN.
RECTIFYING AND INTERRUPTING ALTERNATING CURRENT.
APPLICATION FILED NOV. 1, 1906.
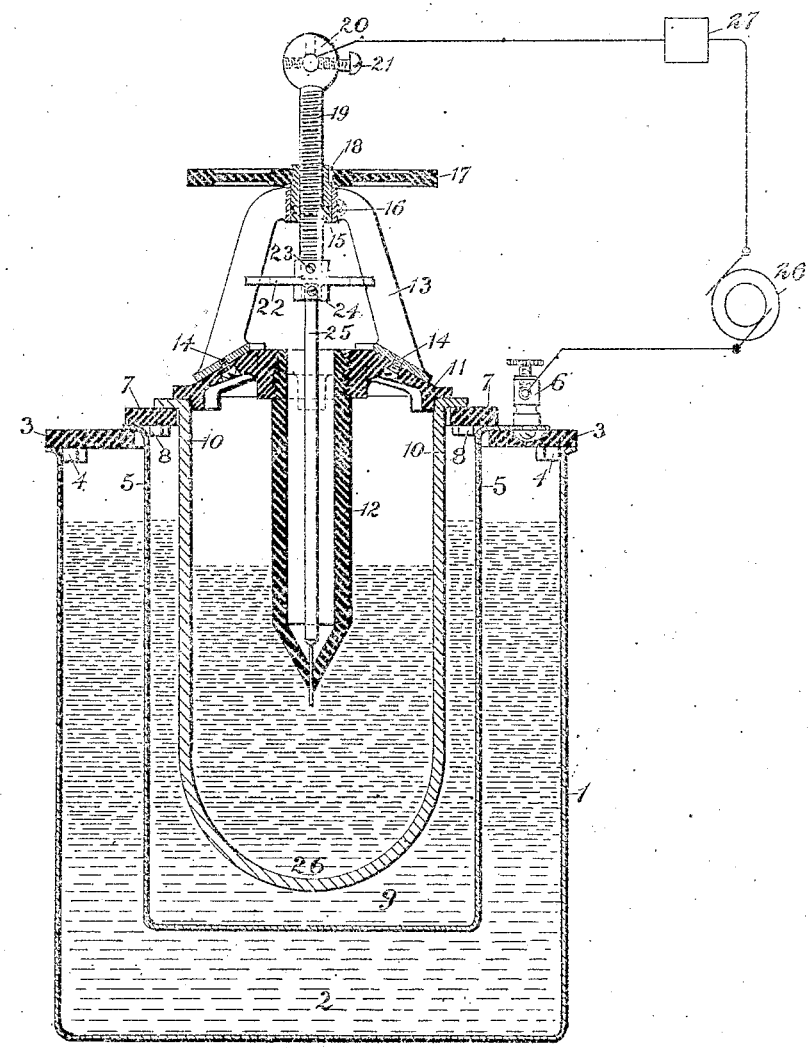
WITNESSES:
INVENTOR

UNITED STATES PATENT OFFICE.

OTTO ROTHENSTEIN, OF CHICAGO, ILLINOIS.

RECTIFYING AND INTERRUPTING ALTERNATING CURRENTS.

No. 864,695.　　　　　Specification of Letters Patent.　　　　　Patented Aug. 27, 1907.

Application filed November 1, 1906. Serial No. 341,577.

*To all whom it may concern:*

Be it known that I, OTTO ROTHENSTEIN, a citizen of the United States, and a resident of Chicago, in the county of Cook and State of Illinois, have invented certain new and useful Improvements in Rectifying and Interrupting Alternating Currents, of which the following is a specification.

This invention relates to a method of rectifying and interrupting alternating currents in a simple and efficient manner. The apparatus for this purpose is shown in the accompanying drawing which represents a sectional elevation of the whole arrangement consisting of the following parts the circuit being represented diagrammatically:—

A receptacle 1, preferably an enameled steel jar, is filled with a refrigerating fluid, 2, preferably common water. The jar 1 is covered with an annular ring 3, made of insulating material, preferably porcelain or the like, said ring being provided with stops 4 to prevent it from sliding off. An aluminium cup 5 rests with its spun rim upon the annular ring 3. Attached to said cup 5 is the binding or terminal post 6. The cup 5 is again covered with an annular ring 7 made of insulating material, preferably porcelain, and provided with the stops 8. The aluminium cup 5 is filled with a solution of phosphate of potash or the like; substitutes for this liquid 9 being well known in the art. A similar shaped cup of smaller dimensions 10 rests with its flange upon the annular ring 7. This cup 10 is made of some "inert" or "passive" conductor as per instance lead, cast iron, or carbon. It is filled to about three quarters of its height with diluted sulfuric acid 26.

The cup 10 is provided with a cover 11, preferably porcelain. As shown clearly in the drawing this cover 11 consists of a round centerpart having a threaded hole and a number of legs with which its location in the center of the cup 10 is fully assured. A tube 12 preferably made of porcelain has one end threaded to fit into the threaded hole of the cover 11, the other end being shaped conical with a small hole in the center. A bracket 13, preferably made of aluminium, is secured to the cover 11 by means of the screws 14. The bracket 13 is bored out to receive the nut 15 suitably grooved and held in position by the set screw 16 in such a manner that said nut 15 can be readily rotated by means of the milled hard rubber disk 17 which is fastened to the shoulder of the nut 15 with the pin 18. A threaded stem 19 fits into the threaded hole of the nut 15 and has on its upper end a ball shaped connecting or terminal post 20 with a clamp screw 21. For the sake of convenience this terminal post 20 is shaped to receive connecting wires from above or front and rear while the clamping screw 21 can be inserted at will from the right or left. The lower end of the threaded stem 19 is fastened in the upper portion of the clamping dog 22, by means of the screw 23, while the screw 24 serves the purpose of holding the active electrode 25 properly in position. This active electrode 25 consists usually of a platinum point secured into a steel rod in a substantial and permanent manner, preferably by brazing. The joint and the steel rod is usually covered with a lead tubing to prevent corrosion.

Adjustment of the platinum point is quickly accomplished by turning the milled hard rubber disk 17, which causes the threaded stem 19 to rise or to descend, according to the direction in which the nut is turned, as the clamp dog 22 embracing the bracket 13 with a loose fit, prevents the stem 19 from turning. There is no sliding or rubbing connection through which the current has to pass as the connecting wire is directly attached to the stem 19. Heating caused by imperfect contact and the comparatively heavy current, employed with devices of this class, is thereby avoided.

The action of the apparatus is readily understood: One pole of the alternating current circuit, supplied by an alternator 26, is attached to the terminal post 6. Connection is made from the terminal post 20 to the device, indicated at 27 to be supplied with rectified interrupted alternating current. The circuit is completed by a connection from the second terminal of said device to the other pole of the alternating current supply. If any regulating devices as for instance a rheostat is used it should be interposed in the last mentioned connection. The aluminium cup 5 acts as a unipolar resistance preventing the passage of positive impulse. The inert electrode is formed by the cup 10 which acts also as inert electrode in the interrupter part of the device. I am aware of the fact that rectifying interrupters have been devised before this, in which a single aluminium electrode is combined with an active electrode of restricted surface, the electrolyte being usually a phosphate solution. The present invention is the result of my experience with such devices. I have found in actual practice that apparatus of this class have several inherent disadvantages. The action of an electrolytic interrupter is based upon the spontaneous development of heat on the active electrode, while the rectifying properties of the aluminium rapidly decrease with an increase of temperature. The conductivity of rectifying solutions is considerably smaller than that of diluted sulfuric acid commonly employed in electrolytic interrupters. To compensate for this low conductivity the active electrode must be larger, thus decreasing the frequency. As the active electrode is usually made of platinum such large active electrodes are more expensive, and the amount of platinum consumed is considerably increased. The consumption of the platinum is further accelerated by the decreased rectifying property of the aluminium as the large amount of inverse current impulses caused by the heating of the rectifying solution rapidly deteriorates the platinum electrodes. As a consequence separate rectifying cells and interrupters are generally preferred, although they are bulky and expensive. By the structural combination of the rectifying cell with the electrolytic interrupter in the manner described and shown here, I preserve the rectifying action of the aluminium fully and obtain an efficient, self contained and reliable apparatus, with a considerable decrease of first cost and maintenance.

I am aware that various minor changes may be introduced without departing from the spirit and scope of my invention for which I claim:

1. In an electrolytic interrupter: A vessel containing a suitable electrolyte, an active electrode of restricted surface suspended therein, means to vary the amount of such restricted surface, a source of alternating current, of higher voltage than the polarization voltage, and an inert electrode of large surface common to said interrupter and to a rectifying cell structurally combined with said interrupter, together with the rectifying cell.

2. An electrolytic rectifying cell: Consisting of an aluminium electrode, a suitable electrolyte and an inert electrode, adapted to serve in the same capacity in some second device which is structurally combined with said rectifying cell.

3. A rectifying electrolytic interrupter consisting of a suitable vessel, an active electrode of restricted surface, suspended in a suitable electrolyte, a rectifying cell structurally associated with said interrupter, an inert electrode common to both devices and a source of alternating current of higher voltage than the polarization voltage of said interrupter.

4. In an electrolytic interrupter: A vessel containing a refrigerating fluid, a second vessel of rectifying material and provided with a binding or terminal post and containing a suitable electrolyte suspended therein; a third vessel of inert material, containing a suitable electrolyte suspended in the second vessel, annular rings of insulating material separating aforesaid vessels electrically, a suitably shaped holder of insulating material carrying an insulating tube, adapted to receive an active electrode of restricted surface, and means to vary the exposed part of said active electrode.

5. In an electrolytic interrupter: A vessel of inert but metallic material, a suitable electrolyte contained therein, an insulating tube suspended from a suitably shaped insulating holder, a metallic bracket, adapted to receive the hub of a suitably formed handwheel, provided with a threaded hole in the center of said hub, a groove in said hub, a set screw in aforesaid bracket coöperating with said groove, a threaded stem provided with a terminal post on its outer end; a clamping dog consisting of a hub, adapted to receive the inner end of said threaded stem and the upper end of the active electrode; and a plurality of arms embracing aforesaid bracket; means to secure said bracket to the insulating holder carrying aforesaid insulating tube; means to secure the inner end of said threaded stem and the upper end of said active electrode within the bore of the hub of aforesaid clamping dog, all substantially as described and shown.

In testimony whereof, I have hereunto set my hand.

OTTO ROTHENSTEIN.

Witnesses:
GEO. B. BLEMING,
H. M. CORWIN.